United States Patent
Wolf et al.

(10) Patent No.: US 12,555,415 B2
(45) Date of Patent: Feb. 17, 2026

(54) ON-VEHICLE SENSOR EVENT AND LOCATION DATA FUSION WITH RATE CONTROL AND ADAPTIVE EVENT THRESHOLDING

(71) Applicant: FORD GLOBAL TECHNOLOGIES, LLC, Dearborn, MI (US)

(72) Inventors: Christopher Wolf, Ann Arbor, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 300 days.

(21) Appl. No.: 18/145,087

(22) Filed: Dec. 22, 2022

(65) Prior Publication Data

US 2024/0212396 A1 Jun. 27, 2024

(51) Int. Cl.
| | |
|---|---|
| G07C 5/00 | (2006.01) |
| B60W 40/02 | (2006.01) |
| G01S 19/42 | (2010.01) |
| H04L 67/12 | (2022.01) |

(52) U.S. Cl.
CPC ............ *G07C 5/008* (2013.01); *B60W 40/02* (2013.01); *G01S 19/42* (2013.01); *H04L 67/12* (2013.01)

(58) Field of Classification Search
CPC ...................................................... G07C 5/008
See application file for complete search history.

(56) References Cited

U.S. PATENT DOCUMENTS

| | | | |
|---|---|---|---|
| 6,519,636 B2 | 2/2003 | Engel et al. | |
| 9,753,987 B1* | 9/2017 | Dolan | G06F 16/182 |
| 10,706,642 B2 | 7/2020 | Throop et al. | |
| 11,954,383 B2* | 4/2024 | Sugiura | G06F 3/121 |
| 11,973,769 B1* | 4/2024 | Le | H04L 63/1425 |
| 11,973,790 B2* | 4/2024 | Klein | H04L 63/1433 |
| 12,046,086 B2* | 7/2024 | Fang | G07C 5/0808 |
| 12,058,157 B1* | 8/2024 | Colon | H04L 63/1425 |
| 12,094,259 B2* | 9/2024 | Fang | B60R 16/023 |
| 2019/0379683 A1* | 12/2019 | Overby | G06F 9/45533 |
| 2021/0192867 A1* | 6/2021 | Fang | G07C 5/0816 |
| 2023/0022152 A1* | 1/2023 | Venkateswaran | G06F 21/575 |

FOREIGN PATENT DOCUMENTS

EP     0731400 A1    9/1996

OTHER PUBLICATIONS

Wikipedia, Leaky Bucket. Retrieved from https://en.wikipedia.org/wiki/Leaky_bucket on Sep. 27, 2022.
Mader et al., Using Interpolation and Extrapolation Techniques to Yield High Data Rates and Ionosphere Delay Estimates from Continuously Operating GPS Networks, Proceedings of the 15th International Technical Meeting of the Satellite Division of the Institute of Navigation (Ion GPS 2002), Sep. 24-27, 2022, Portland, Oregon (pp. 2342-2348).

* cited by examiner

*Primary Examiner* — Jean Paul Cass
(74) *Attorney, Agent, or Firm* — Joseph Zane; Brooks Kushman P.C.

(57) ABSTRACT

A signal is received from a sensor or other controller of the vehicle. A bucket state is incremented responsive to the signal exceeding a signal threshold. An event is generated responsive to the bucket state exceeding a bucket threshold value. The event is sent, in an event message, to a cloud server.

19 Claims, 16 Drawing Sheets

ON-VEHICLE SENSOR EVENT AND LOCATION DATA FUSION WITH RATE CONTROL AND ADAPTIVE EVENT THRESHOLDING

TECHNICAL FIELD

Aspects of the present disclosure generally relate to on-vehicle sensor event and location data fusion with rate control and adaptive event thresholding.

BACKGROUND

Connected vehicles may send data to a cloud system. As the cloud system receives thousands of messages from millions of vehicles, this quantity of data may become large.

SUMMARY

In one or more illustrative examples, a system for providing sensor events includes a first controller of a vehicle. The first controller is programmed to receive a signal from a sensor or other controller of the vehicle, increment a bucket state responsive to the signal exceeding a signal threshold, generate an event responsive to the bucket state exceeding a bucket threshold value, and send the event, in an event message, to a cloud server.

In one or more illustrative examples, a method for providing sensor includes receiving, by a first controller of a vehicle, a signal from a sensor or other controller of the vehicle; incrementing a bucket state, by the first controller, responsive to the signal exceeding a signal threshold; generating an event, by the first controller, responsive to the bucket state exceeding a bucket threshold value; and sending the event, in an event message, by the first controller to a cloud server.

In one or more illustrative examples, a non-transitory computer-readable medium comprising instructions for providing sensor events that, when executed by a first controller of a vehicle, cause the vehicle to perform operations including to receive a signal from a sensor or other controller of the vehicle; increment a bucket state responsive to the signal exceeding a signal threshold; generate an event responsive to the bucket state exceeding a bucket threshold value; and send the event, in an event message, to a cloud server.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Modern vehicles are equipped with a wide variety of sensors as well as a modem to enable the transmission of information. In an example, one application of such data is the use of the vehicle as a sensor of its surroundings. The fusion of vehicle sensor data, along with GNSS location data, can provide valuable insight about the environments through which the vehicles traverse. The large number of vehicles, combined with a wide variety of driving locations and habits, provides significant geographic coverage. Transmission of information via this model has a resource requirement; however, and the resource requirement should be balanced with the quality and usefulness of the data being exchanged. The efficient fusion of vehicle sensor data with GNSS data, along with edge-based information extraction and distillation algorithms, may enhance the value of the crowdsourced data as compared to the resource requirements.

An edge computing algorithm may be utilized to efficiently extract the geospatial location associated with discrete events that are detected by the on-vehicle sensor set. The algorithm may include aspects to control the overall rate of data transmission, aspects to ensure the data is of high value, and aspects to automatically adapt the algorithm for various vehicle models and environments. The geospatial information quality should be robust to differences between the signal sample rates and the GNSS sample rates available on the vehicle. Thus, the edge algorithm may be configured to reduce computational burden on the vehicle processing systems and also to operate without excessive calibration, while also minimizing the amount of data transmitted from the vehicle while maximizing its targeted value.

Figure 1:
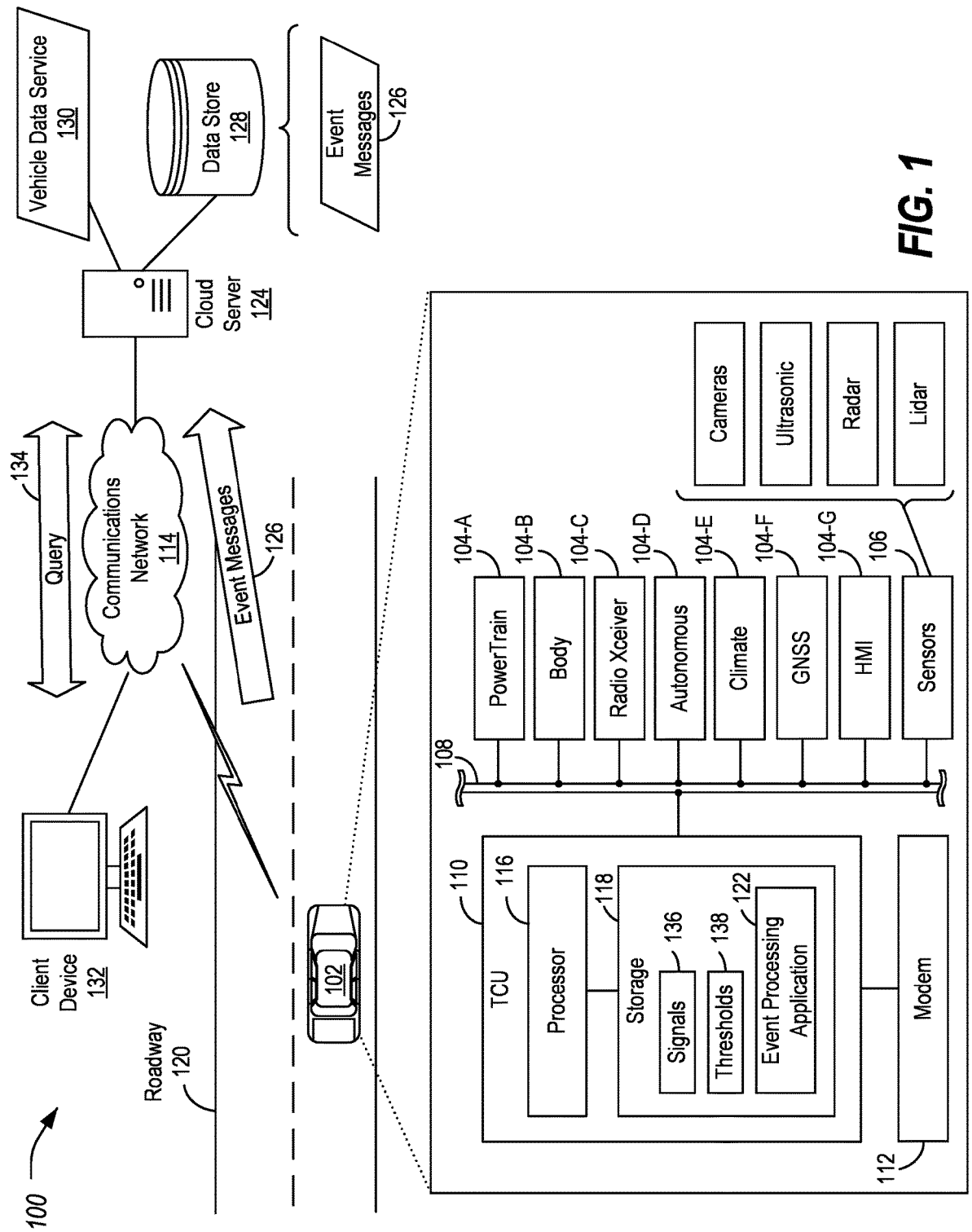
FIG. 1 illustrates an example system for performing on-vehicle sensor event and location data fusion with rate control and adaptive event thresholding.

FIG. 1 illustrates an example system 100 for performing on-vehicle sensor event and location data fusion with rate control and adaptive event thresholding. The system 100 may include a vehicle 102, which may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a GNSS controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

One or more vehicle buses 108 may include various methods of communication available between the vehicle controllers 104, as well as between a telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network.

The TCU 110 may include network hardware configured to facilitate communication between the vehicle controllers 104 and with other devices of the system 100. For example, the TCU 110 may include or otherwise access a modem 112 configured to facilitate communication over a communication network 114. The TCU 110 may, accordingly, be configured to communicate over various protocols, such as with the communication network 114 over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 116 configured to execute computer instructions, and a storage 118 medium on which the computer-executable instructions and/or data may be maintained. A computer-readable storage medium (also referred to as a processor-readable medium or storage 118) includes any non-transitory (e.g., tangible) medium that participates in providing data (e.g., instructions) that may be read by a computer (e.g., by the processor(s)). In general, the processor 116 receives instructions and/or data, e.g., from the storage 118, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, etc.

The TCU 110 may be configured to include one or more interfaces from which vehicle information may be sent and received. This information can be sensed, recorded, and sent to one or more cloud servers 124. In an example, similar to the TCU 110, the cloud server 124 may also include one or more processors (not shown) configured to execute computer instructions, and a storage medium (not shown) on which the computer-executable instructions and/or data may be maintained.

The TCU 110 may be configured to facilitate the collection of vehicle information from the vehicle controllers 104 connected to the one or more vehicle buses 108. While only a single vehicle bus 108 is illustrated, it should be noted that in many examples, multiple vehicle buses 108 are included, usually with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to transmit event messages 126 over the communication network 114 for reception by the cloud server 124. In an example, the management of sending event messages 126 may be handled by an event processing application 122 executed by the TCU 110. The event messages 126 may include signals retrieved from the controllers 104 and/or the sensors 106 over the vehicle buses 108. The event messages 126 may include data descriptive of various vehicle signals along the vehicle bus 108. These signals may be useful in the identification of conditions along the roadway 120.

The event messages 126 may further include contextual information with respect to the location of the vehicle 102 when the events occurred. In an example, the TCU 110 may also capture location information from the GNSS controller 104F that may be used to augment the captured event information with locations of where the vehicle 102 was when the events occurred. The event messages 126 captured by the TCU 110 may also include, as some non-limiting examples, latitude, longitude, time, heading angle, speed, throttle position, brake status, steering angle, headlight status, wiper status, external temperature, turn signal status, ambient temperature or other weather conditions, etc.

In an example, the collection of event messages 126 may be performed in an event-based manner, in which the vehicles 102 send the event messages 126 to the cloud server 124 responsive to occurrence of the event. For instance, when an event is indicated by the vehicle 102 (such as by a sharp impulse in an accelerometer signal), the event messages 126 message may be sent from the modem 112 of the vehicle 102 to the cloud server 124, the message containing event information (loss magnitude, indicator type, etc.) as well as the GNSS coordinates at which the event occurred. Alternatively, this information can also be compiled from continuously sampled data from the vehicle buses 108, e.g., to the storage 118 of the TCU 110, which may allow for batch uploading of event messages 126 from the vehicle 102. Following the collection of event information, the event messages 126 may be sent to the cloud server 124 via the on-vehicle modem 112 (or in another example, via a cell phone connected to the vehicle 102).

The cloud server 124 may be configured to receive the event messages 126 and store the event messages 126 in a data store 128. This information may be maintained for querying by a vehicle data service 130. The system 100 may further include one or more client devices 132 configured to access the cloud server 124 over the communication network 114. Using the services of the vehicle data service 130 of the cloud server 124, one or more client devices 132 may be configured to perform queries 134 of the event messages 126 for various information.

In addition to compiling event data from the sensors 106, the TCU 110 (and/or other controllers of the vehicle 102) may utilize edge-processing capabilities to augment the event messages 126 as well as to determine what event messages 126 to send to the cloud server 124.

Figure 4:
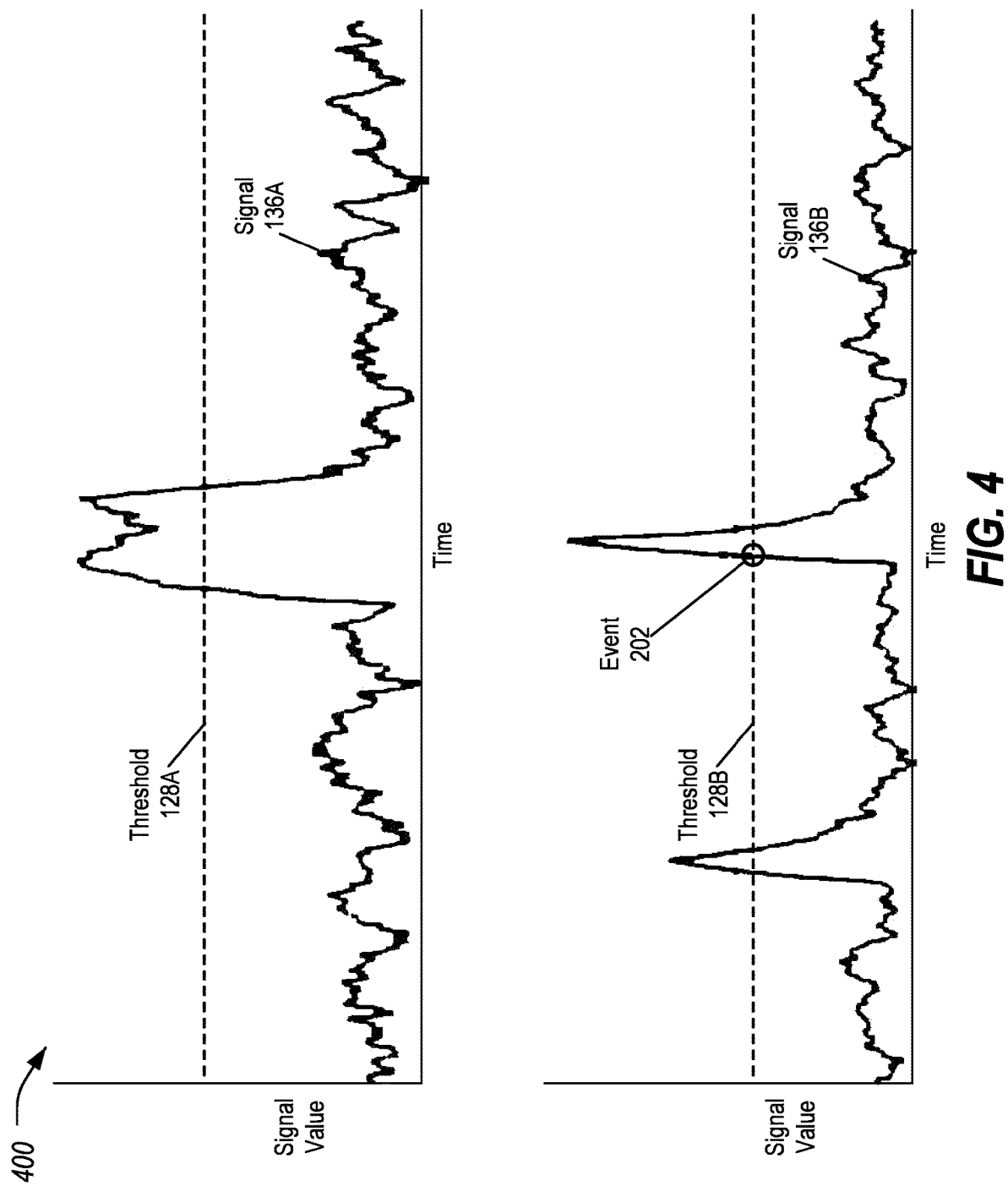
FIG. 4 illustrates an example graph of a comparison of multiple signals over time in relation to multiple thresholds.
Figure 5:
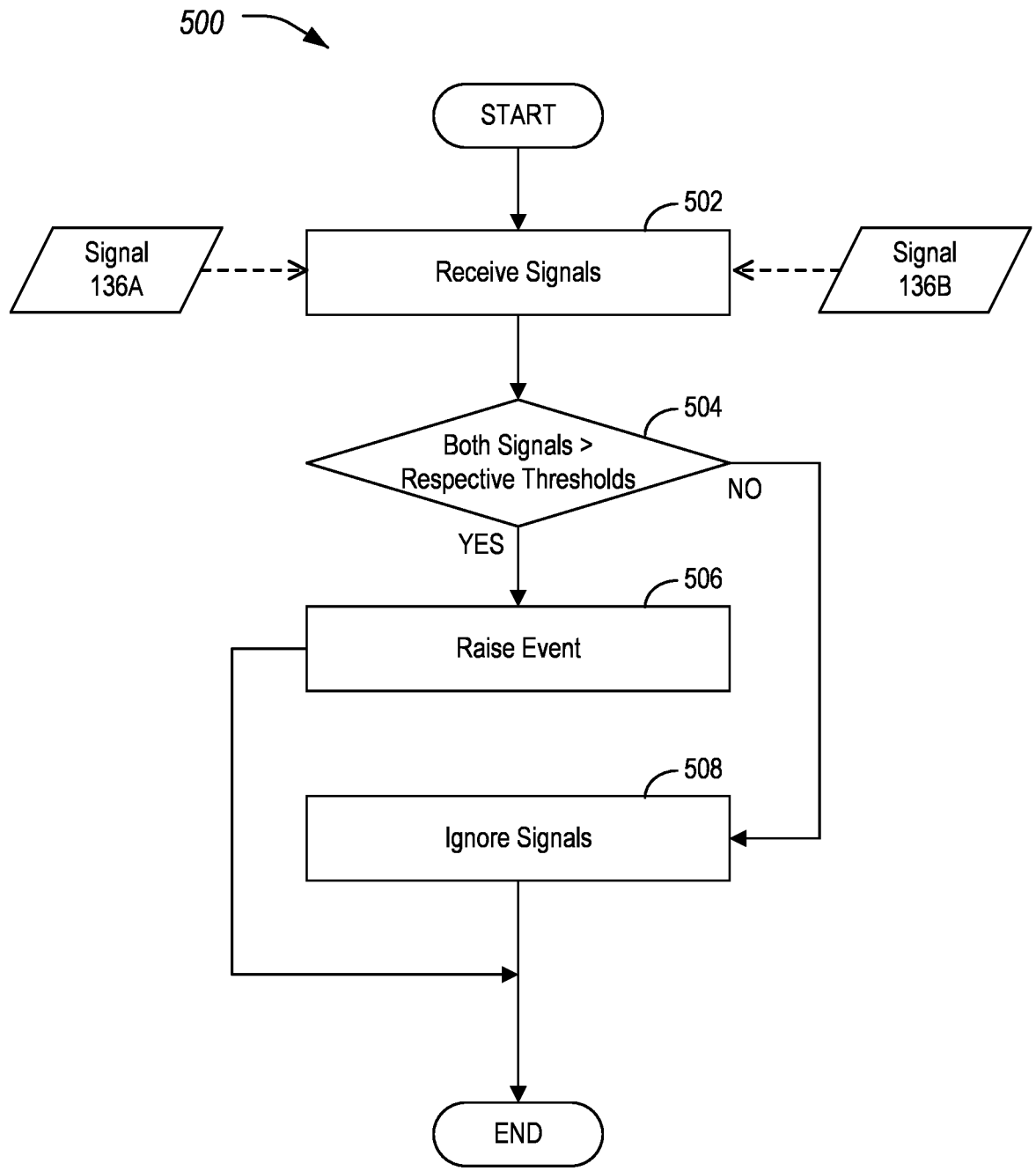
FIG. 5 illustrates an example process of the operation of the event processing application to perform a signal and threshold comparison for multiple signals and thresholds.
Figure 6:
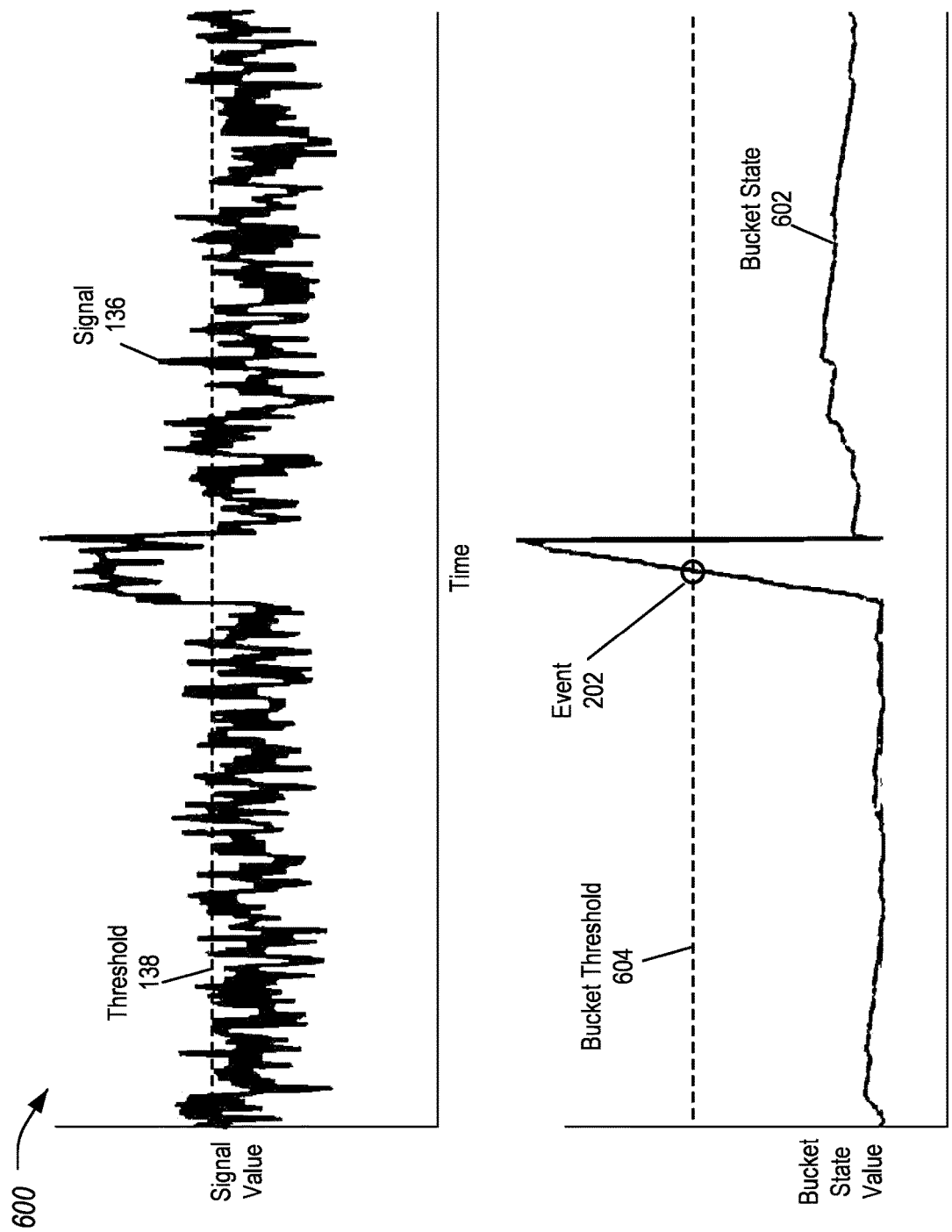
FIG. 6 illustrates an example graph of a comparison of a bucket state over time in relation to bucket threshold.
Figure 7:
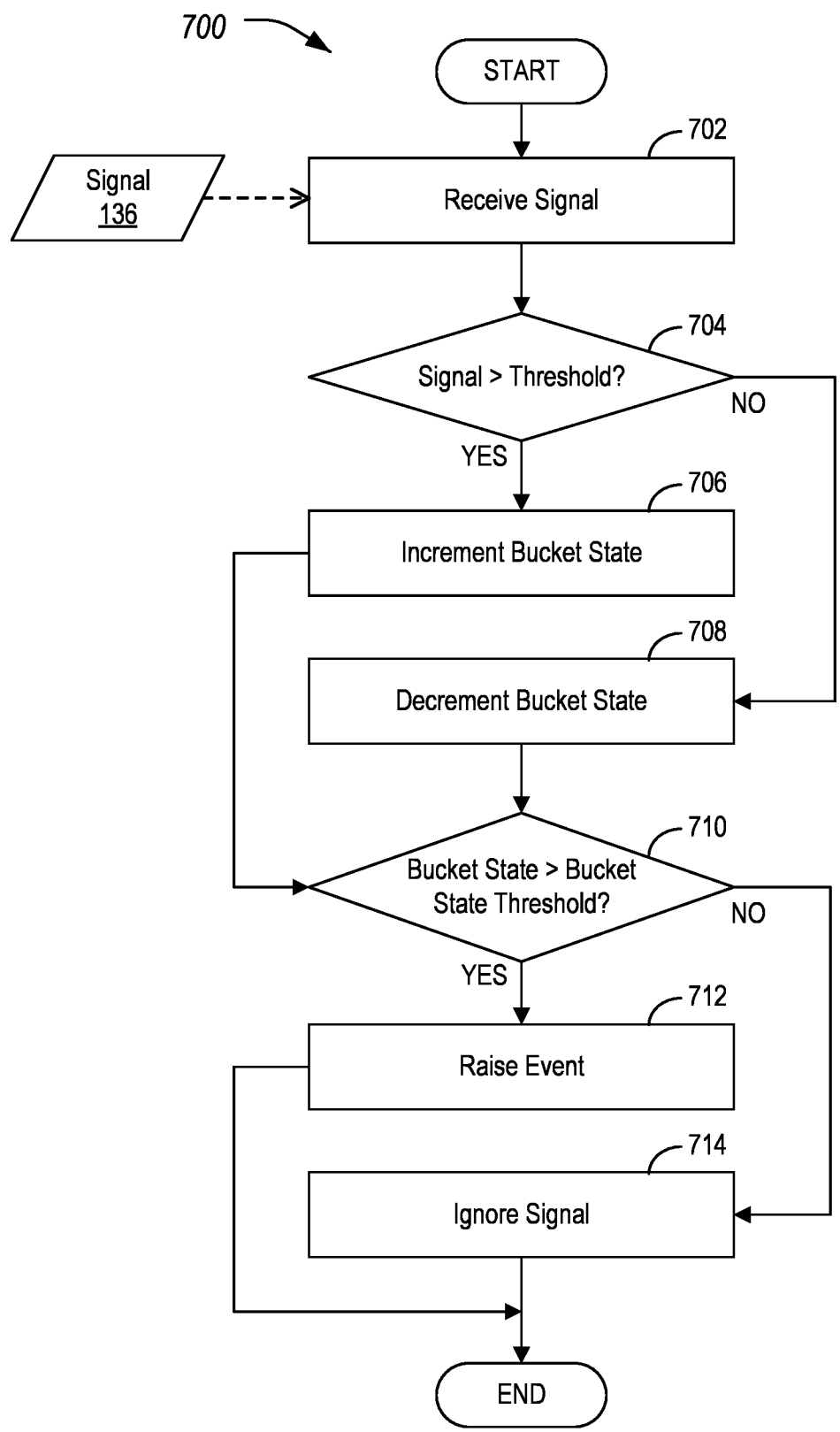
FIG. 7 illustrates an example process of the operation of the event processing application to perform a comparison of the bucket state over time in relation to the bucket threshold.
Figure 10:
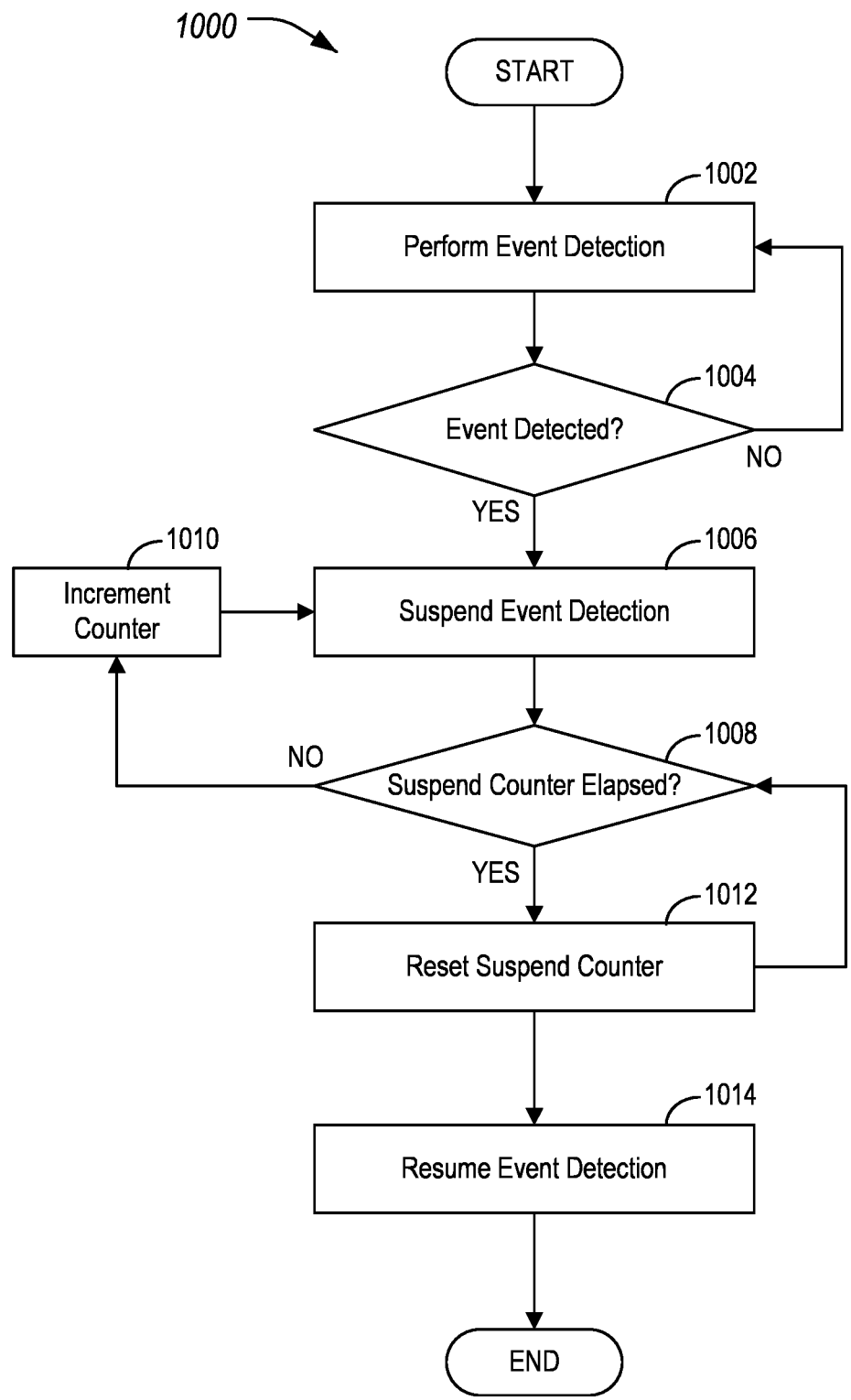
FIG. 10 illustrates an example process for rate limiting of detection of events.
Figure 11:
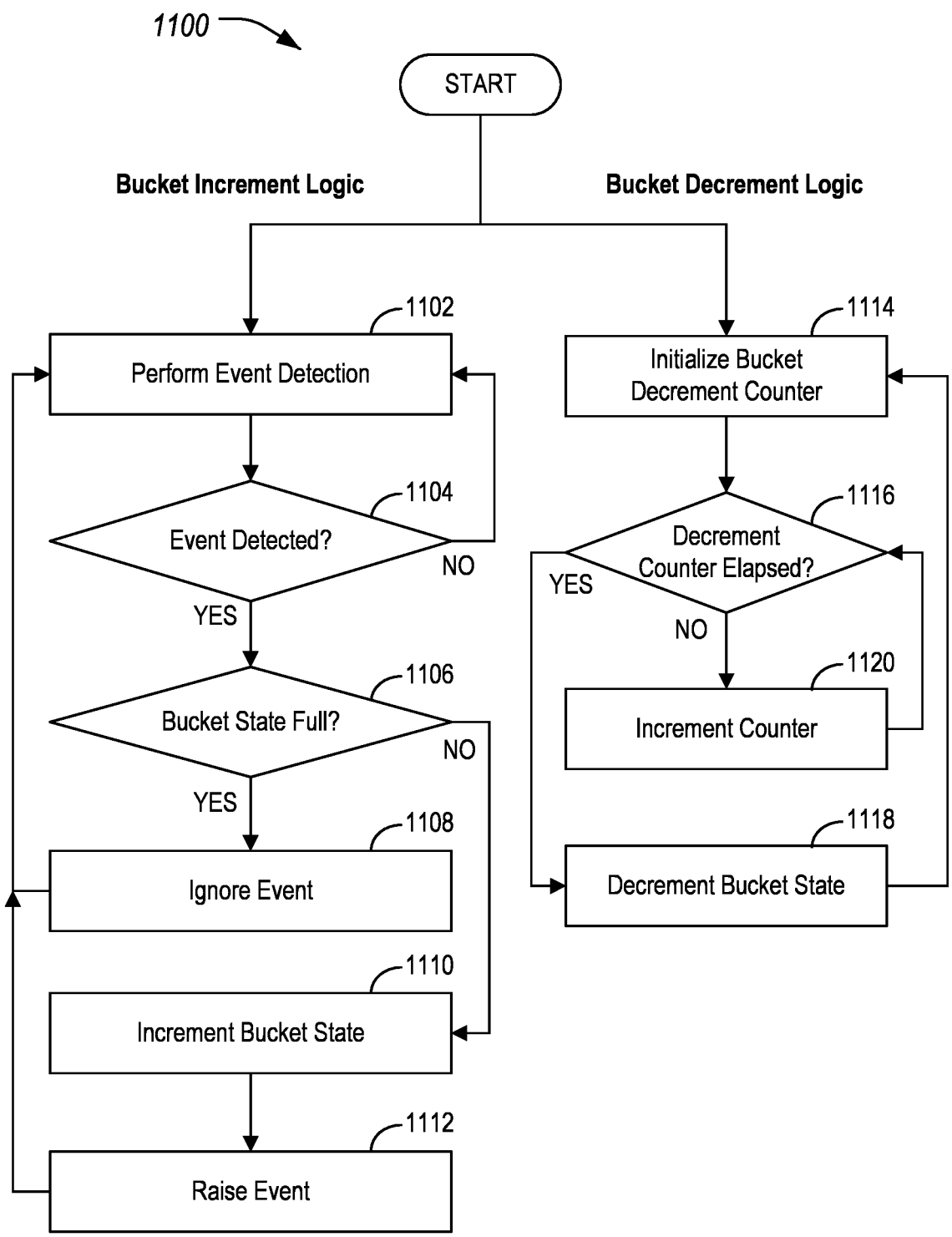
FIG. 11 illustrates an example process for rate limiting of detection of event when utilizing a leaky bucket type algorithm.
Figure 12:
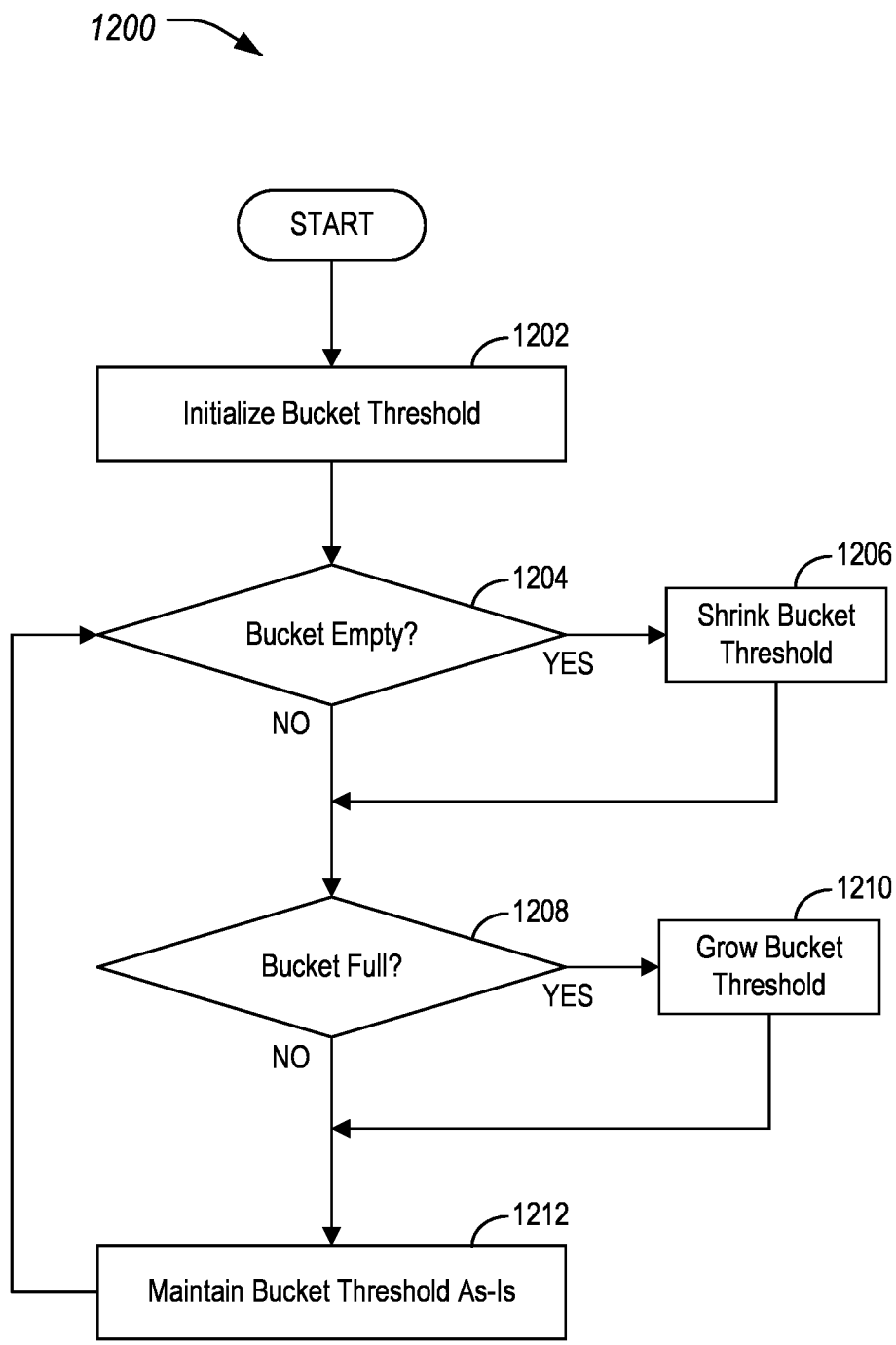
FIG. 12 illustrates an example process for adaptation of the bucket threshold for use in a leaky bucket implementation.
Figure 13:
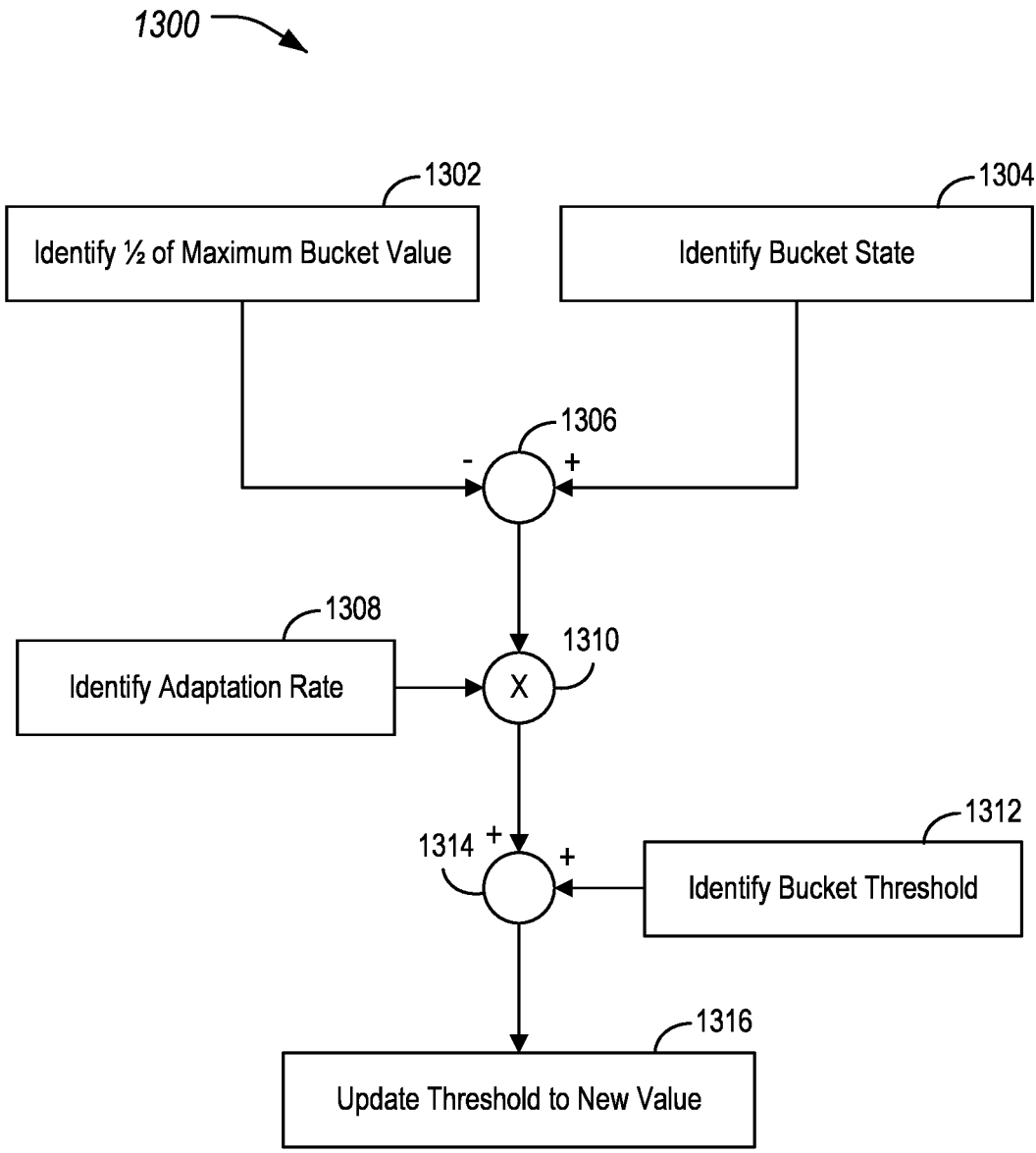
FIG. 13 illustrates an alternate example process for adaptation of the bucket threshold for use in a leaky bucket implementation.
Figure 14:
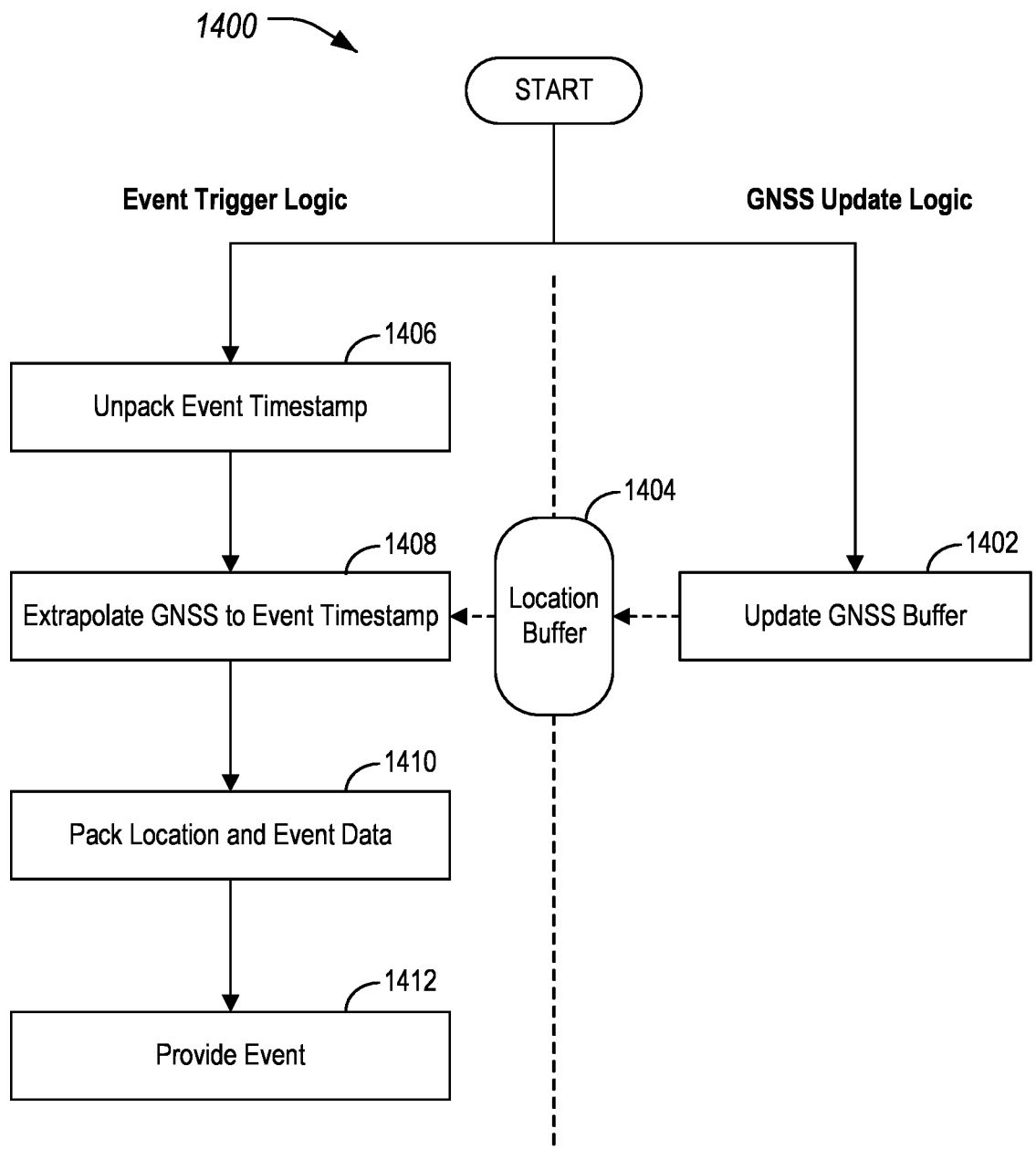
FIG. 14 illustrates an example process for performing global navigation satellite system (GNSS) upscaling with respect to the augmentation of the events with location information.
Figure 15:
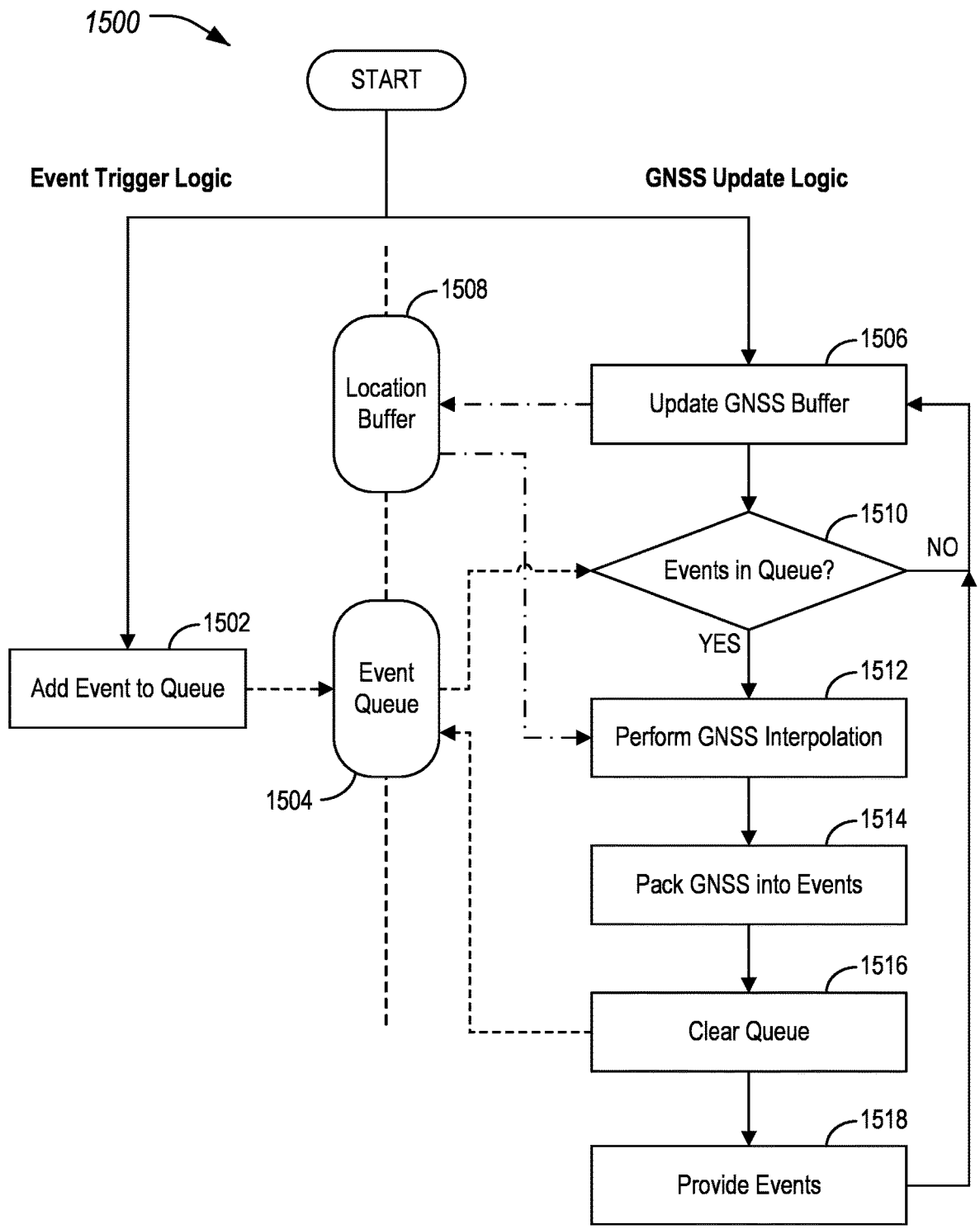
FIG. 15 illustrates an alternate example process for performing GNSS upscaling with respect to the augmentation of the events with location information.

In an example, the event processing application 122 may be programmed to perform robust detection of events based on signals 136 received from the sensors 106 and/or controllers 104, including the extraction of high value event information exceeding one or more thresholds 138 or other criteria. For instance, the detection may include to compare a signal 136 with a threshold 138 (e.g., as shown in FIGS. 2-3 and 8-9). In another instance, the detection may include to compare multiple signals 136 with respective thresholds 138 (e.g., as shown in FIGS. 4-5). In yet another instance, the detection may include to accumulate of values of the signal 136, sometimes referred to as a leaky bucket approach (e.g., as shown in FIGS. 6-7). In another example, the event processing application 122 may be programmed to perform event rate control, e.g., to prevent rapid successive events that may be redundant or that may produce excess data consumption (e.g., as shown in FIGS. 10-11). In yet another example, the event processing application 122 may perform adaptation of the thresholds 138 with variable adaptation rates, e.g., to focus on differences between models or differences between environments (e.g., as shown in FIGS. 12-13). In still another example, the event processing application 122 may perform robust GNSS up-scaling, e.g., to compensate for slow GNSS update rates (e.g., as shown in FIGS. 14-15).

Regardless of approach, the detected events, as processed, may be packaged by the vehicle 102 into event messages 126, and provided to the cloud server 124 for analysis, e.g., by the client devices 132.

Figure 2:
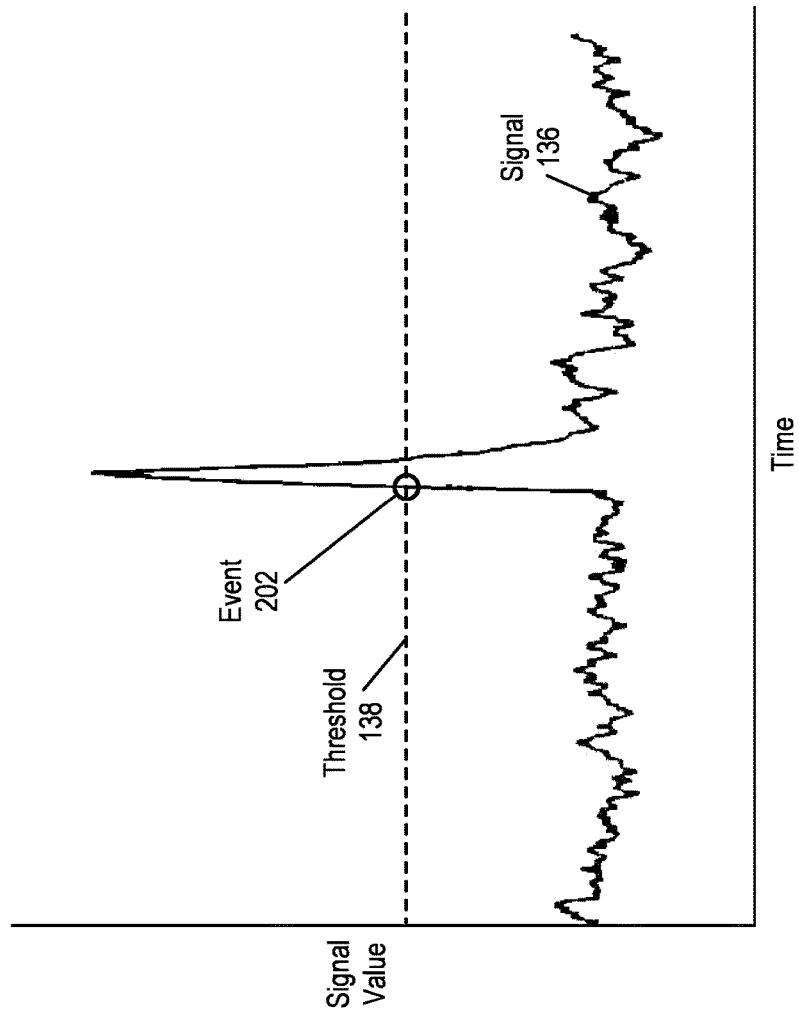
FIG. 2 illustrates an example graph of a signal over time in relation to a threshold.

FIG. 2 illustrates an example graph 200 of a comparison of a signal 136 over time in relation to a threshold 138. In this context, an event 202 refers to a salient occurrence tied to a specific location and/or time. As shown in the graph 200, the event 202 is detected by comparing the signal 136 with the threshold 138. More specifically, in the example the signal 136 crosses the threshold 138 from below the threshold 138 value to above the threshold 138 value to generate the event 202. The instant at which the signal 136 crosses the threshold 138 is the instant of the event 202. This event 202 may be indicated in an event message 126.

Figure 3:
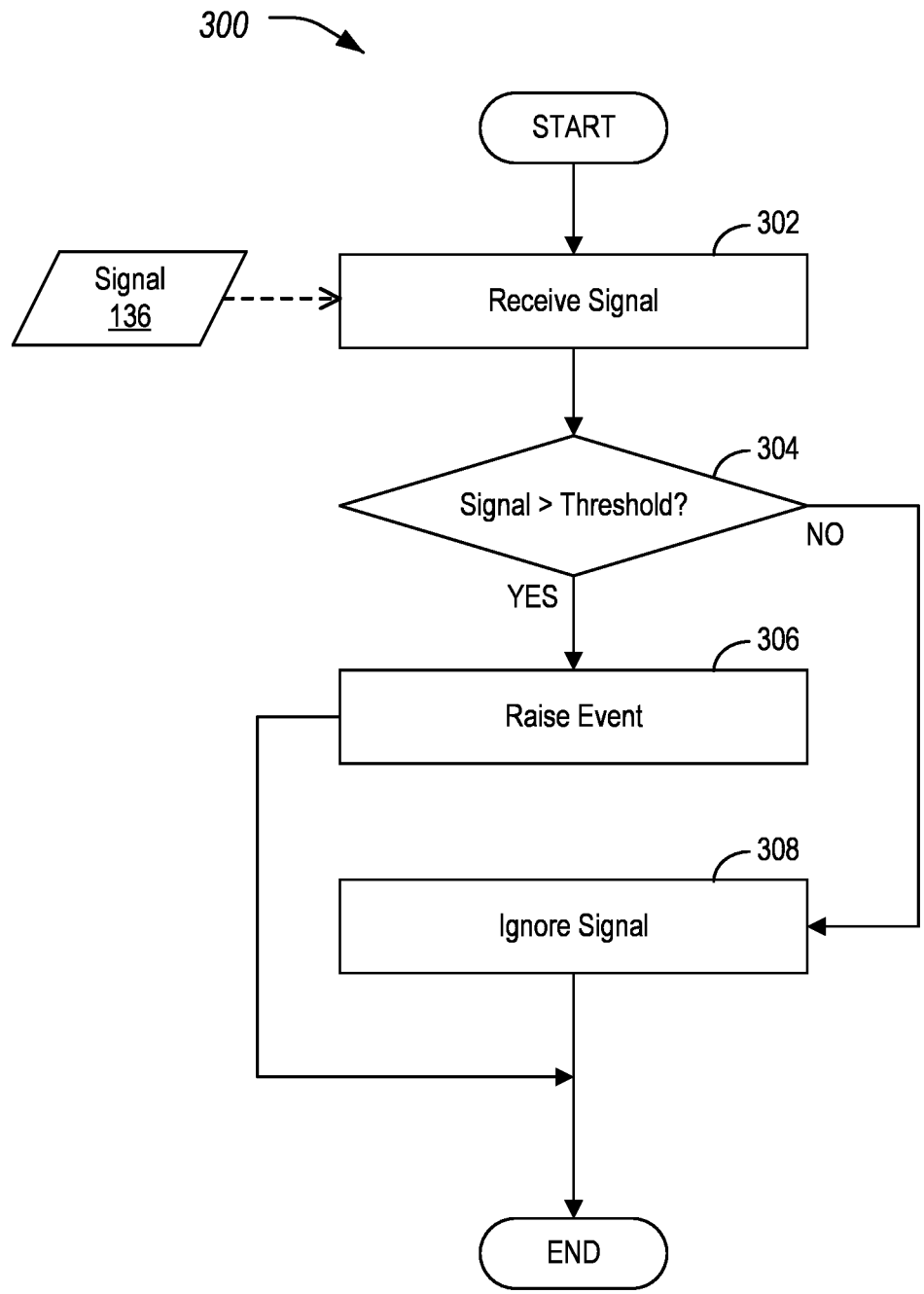
FIG. 3 illustrates an example process of the operation of the event processing application to perform a simple signal and threshold comparison.

FIG. 3 illustrates an example process 300 of the operation of the event processing application 122 to perform a simple signal 136 and threshold 138 comparison. In an example, the process 300 may be used by the event processing application 122 to generate the event 202 as shown in the graph 200.

At operation 302, the event processing application 122 receives a signal 136. In an example, the signal 136 may be received from one or more sensors 106 and/or controllers 104 of the vehicle 102. This signal 136 may be received, in an example over the vehicle bus 108 to the TCU 110 (or other controller 104) executing the event processing application 122.

At operation 304, the event processing application 122 determines whether the signal 136 exceeds the threshold 138. If so, control passes to operation 306 in which the event processing application 122 raises the event 202. Otherwise, control passes to operation 308 in which the event processing application 122 ignores the signal 136.

It be noted that, in some implementations, the event 202 is only raised as the signal 136 rises from being below the threshold 138 to exceeding the threshold 138, such that the event 202 may not again trigger merely by the signal 136 merely continuing to exceed the threshold 138. Instead, the event 202 may not again trigger until the signal 136 falls below the threshold 138 and then again exceeds the threshold 138. It should also be noted that in some examples the values may be reversed, and the threshold 138 may be a value to fall below to trigger the event 202, as opposed to a minimum value to exceed.

After operations 306 or 308 the process 300 ends. It should be noted that while the process 300 is shown as a single iteration, in many examples the process 300 may be performed continuously, such as in a loopwise manner. It should also be noted that one or more operations 302-308 of the process 300 may be executed concurrently, and/or out of order from as shown in the process 300.

FIG. 4 illustrates an example graph 400 of a comparison of multiple signals 136 over time in relation to multiple thresholds 138. More specifically, the graph 400 illustrates a comparison of a signal 136A over time in relation to a threshold 138A, and further a comparison of a signal 136B over time in relation to a threshold 138B.

In this example, the event 202 triggers if the multiple signals 136A, 136B both are above their individually calibrated thresholds 138A, 138B. In this example, the event 202 is only registered once both signals 136A, 136B are above their thresholds 138A, 138B. As can be seen, no event 202 is triggered responsive the signal 136B exceeding the threshold 138B before the signal 136A has exceeded the threshold 138A. Additionally, the event 202 is not triggered merely by the signal 136A exceeding the threshold 138A, but then is triggered once the signal 136B exceeds the threshold 138B with the signal 136A concurrently exceeding the threshold 138A.

FIG. 5 illustrates an example process 500 of the operation of the event processing application 122 to perform a signal 136 and threshold 138 comparison for multiple signals 136 and thresholds 138. In an example, the process 500 may be used by the event processing application 122 to generate the event 202 as shown in the graph 400.

At operation 502, the event processing application 122 receives multiple signals 136. This may be performed similar to operation 302, but instead of receiving a single signal 136, the event processing application 122 may receive signal 136A and signal 136B.

At operation 504, the event processing application 122 determines whether both signals 136A, 136B exceeds respective thresholds 138A, 138B. If so, control passes to operation 506 in which the event processing application 122 raises the event 202. Otherwise, control passes to operation 508 in which the event processing application 122 ignores the signals 136A, 136B.

After operations 506 or 508, the process 500 ends. It should be noted that while the process 500 is shown as a single iteration, in many examples the process 500 may be performed continuously, such as in a loopwise manner. It should also be noted that one or more operations 502-508 of the process 500 may be executed concurrently, and/or out of order from as shown in the process 500.

FIG. 6 illustrates an example graph 600 of a comparison of a bucket state 602 over time in relation to a bucket threshold 604. If there is significant noise on the signal 136 relative to the content of interest, then a simple threshold 138 comparison may not be robust. An alternative detection algorithm may instead be employed to detect sufficiently sustained salience. A common example of such an algorithm is known as a leaky bucket algorithm. In such an algorithm, the bucket state 602 variable accumulates evidence of an event 202, and this accumulation also decays over time (i.e., leaks). If the rate of accumulation exceeds the rate of decay for a sufficiently long period, the accumulating bucket state 602 variable crosses its own bucket threshold 604 signifying an event 202.

As shown, the signal 136 of interest has significant noise which make the simple threshold 138 comparison a poor choice. The signal 136 is instead compared with a threshold 138, and when signal 136 exceeds the threshold 138 the bucket state 602 is incremented (usually by an amount equal to the difference between the signal 136 and threshold 138). If the signal 136 is below the threshold 138 the bucket state 602 is decremented by some calibrated amount. If the bucket state 602 reaches a predetermined bucket threshold 604 an event 202 is detected and the bucket state 602 is reset. This example illustrates how an event 202 requires a sufficient accumulation of evidence.

FIG. 7 illustrates an example process 700 of the operation of the event processing application 122 to perform a comparison of the bucket state 602 over time in relation to the bucket threshold 604. In an example, the process 700 may be used by the event processing application 122 to generate the event 202 as shown in the graph 600.

At operation 702, the event processing application 122 receives the signal 136. This may be performed similar to operation 302.

At operation 704, the event processing application 122 determines if the signal 136 exceeds the threshold 138. If so, control passes to operation 706 to cause the event processing application 122 to increment the bucket state 602. This increment may be, in an example, by a fixed, predetermined amount. Or, this increment may be a difference between the signal 136 and the threshold 138 in another example.

If, at operation 704 the signal 136 does not exceed the threshold 138, control passes to operation 708 to decrement the bucket state 602. This decrement may be by a fixed, predetermined amount.

After operations 706 or 708, control passes to operation 710. At operation 710, the event processing application 122 determines whether the bucket state 602 exceeds the bucket threshold 604. If so, control passes to operation 712 to raise the event 202. If not, control passes to operation 714 to ignore the signal 136.

After operations 712 or 714, the process 700 ends. It should be noted that while the process 700 is shown as a single iteration, in many examples the process 700 may be performed continuously, such as in a loopwise manner. It should also be noted that one or more operations 702-714 of the process 700 may be executed concurrently, and/or out of order from as shown in the process 700.

Figure 8:
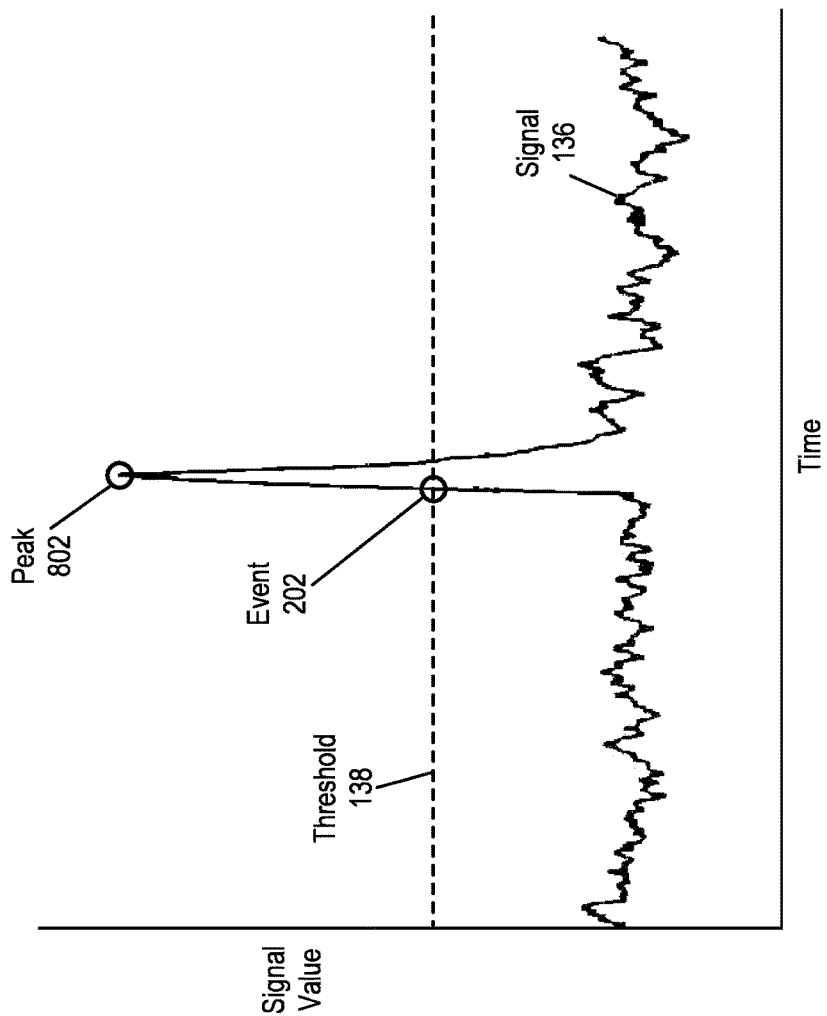
FIG. 8 illustrates an example graph of a signal over time in relation to a threshold, including an indication of a peak of the signal.

FIG. 8 illustrates an example graph 800 of a signal 136 over time in relation to a threshold 138, including an indication of a peak 802 of the signal 136. Once an event 202 is triggered, an additional enhancement can be used to ensure the event 202 represents the most salient signal 136 behavior. As shown, using the simple single state threshold 138 comparison process 300, the event 202 may be triggered before the true peak 802 of the signal 136.

To remedy this, an additional behavior can be added to the algorithm where the original threshold 138 crossing (or leaky bucket threshold 604 crossing) will not trigger a true event 202 but instead trigger an event 202 search period. For some period of time after the threshold 138 crossing the signal 136 of interest will be examined to predict the true peak 802 behavior.

Figure 9:
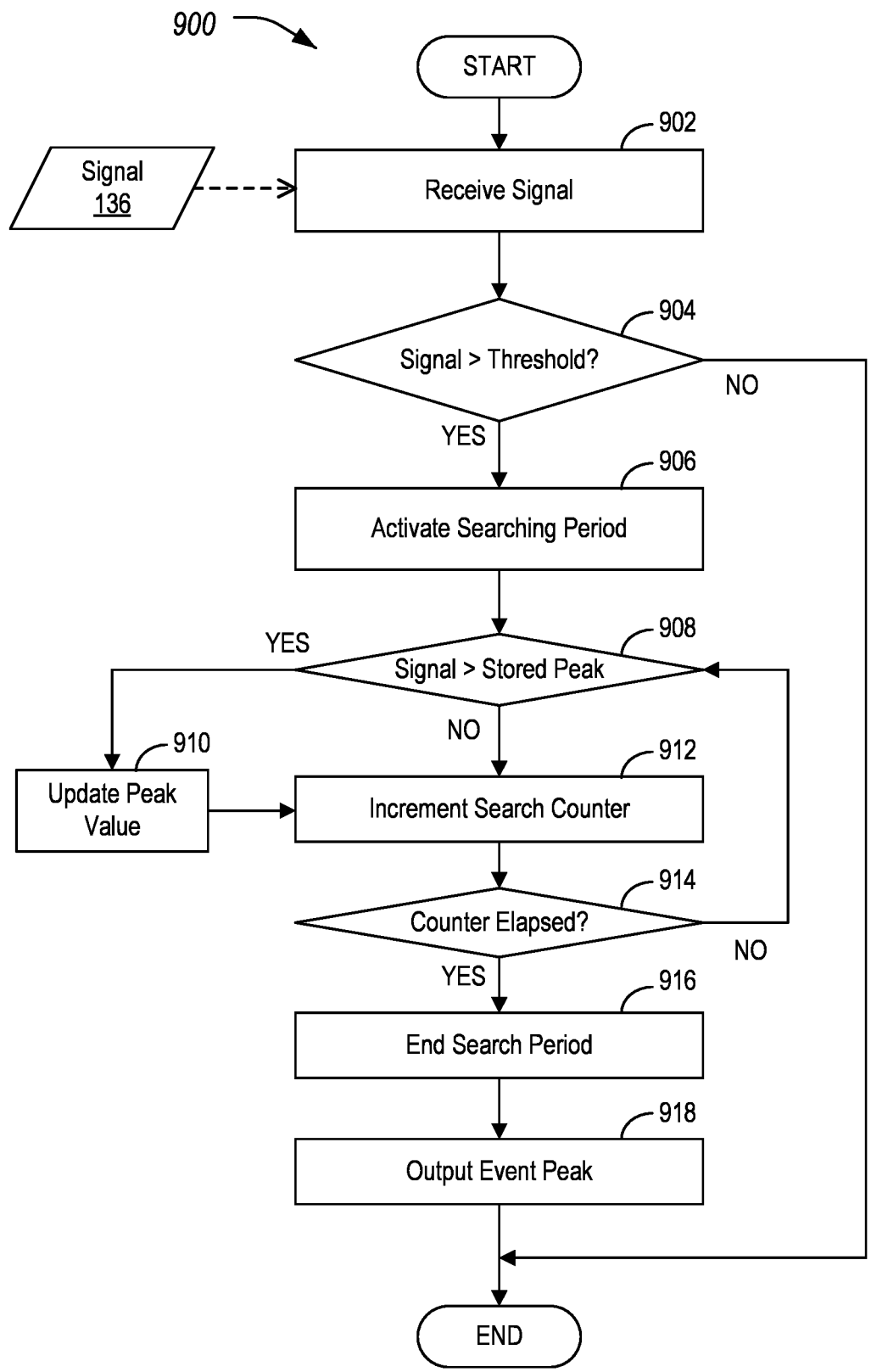
FIG. 9 illustrates an example process of the operation of the event processing application to perform peak detection over a search period based on detection of the event.

FIG. 9 illustrates an example process 900 of the operation of the event processing application 122 to perform peak 802 detection over a search period based on detection of the event 202. In an example, the process 900 may be used by the event processing application 122 to generate the event 202 as shown in the graph 600, but also referencing the value of the peak 802.

At operation 902, similar to operation 302, the event processing application 122 receives a signal 136. At operation 904, similar to operation 304, the event processing application 122 determines whether the signal 136 exceeds the threshold 138. If not, the signal 136 is ignored and the process 900 ends.

If, however, the signal 136 exceeds the threshold 138, control passes to operation 906. At operation 906, the event processing application 122 activates a searching period. During the searching period, the event processing application 122 attempts to identify the peak 802 value. Initially, the event processing application 122 stores the current signal 136 value that triggered the event 202 as being the peak 802 value.

At operation 908, the event processing application 122 determines whether the signal 136 value has exceeded the stored peak 802 value. If so, control passes to operation 910 to update the peak 802 value to the new maximum value. After operation 910, or after operation 908 if the signal 136 does not exceed the stored peak 802, control passes to operation 912 to cause the event processing application 122 to increment the search counter.

At operation 914, the event processing application 122 determines whether the search counter has elapsed. The search counter may be set to a predetermined amount of time, samples, etc., to allow for the detection of the peak 802. If the search counter has not elapsed, then control returns to operation 908. If the search counter has elapsed, control passes to operation 916.

At operation 916, the event processing application 122 ends the search period. Thus, the peak 802 will no longer be updated for the specific event 202 that was raised. At operation 918, the event 202 is raised, including the peak 802. Significantly, as opposed to the earlier processes such as the process 300, the peak 802 value may be used in the event 202, as opposed to simply the value of the signal 136 at which the event 202 was triggered.

After operations 904 or 918, the process 900 ends. It should be noted that while the process 900 is shown as a single iteration, in many examples the process 900 may be performed continuously, such as in a loopwise manner. It should also be noted that one or more operations 902-914 of the process 900 may be executed concurrently, and/or out of order from as shown in the process 900.

FIG. 10 illustrates an example process 1000 for rate limiting of detection of events 202. For example, certain applications may incur a resource utilization for each detected event 202, such as the data expense of data transmission of the event 202 over a cellular network. The process 1000 may be used to limit the rate of event 202 to bound these resource utilizations. There are multiple aspects of a rate limiting feature, including: enforcing minimum period between events 202, ignoring events 202 after period of excessive events 202, and/or enforcing a minimum period between events 202 can be accomplished with this simple logic flow diagram.

At operation 1002, the event processing application 122 performs event 202 detection. In an example the detection of events 202 may be performed using one or more of the processes 300, 500, 700, or 900 discussed above.

At operation 1004, the event processing application 122 determines whether an event 202 was detected. As some examples, this may be responsive to the events 202 detected at one or more of operations 306, 506, 712, or 918. If so, control passes to operation 1006. Otherwise, control returns to operation 1002.

At operation 1006, the event processing application 122 suspends detection of events 202. In an example, the operation of one or more of the processes 300, 500, 700, or 900 discussed above may be suspended, such that no further events 202 are generated.

At operation 1008, the event processing application 122 determines whether the suspend counter has elapsed. In an example, the suspend counter may be set to a predetermined amount of time, samples, etc., to allow for the suppression of events 202. If the suspend counter has not elapsed, then control moves to operation 1010 to increment the suspend counter. If the suspend counter has elapsed, control passes to operation 1012.

At operation 1012, the event processing application 122 resets the suspend counter. At operation 1014, the event processing application 122 resumes detection of events 202. In an example, the operation of one or more of the processes 300, 500, 700, or 900 discussed above may be resumed, such that further events 202 may be generated based on received signals 136. After operation 1014 the process 1000 ends.

It should be noted that while the process 1000 is shown as a single iteration, in many examples the process 1000 may be performed continuously, such as in a loopwise manner. It should also be noted that one or more operations 1002-1012 of the process 1000 may be executed concurrently, and/or out of order from as shown in the process 1000.

FIG. 11 illustrates an example process 1100 for rate limiting of detection of event 202 when utilizing a leaky bucket type algorithm. The process 1100 provides a more robust and flexible alternative to event 202 rate bounding as shown in the process 1000. In the process 1100, detection of an event 202 increments the bucket state 602, and a counter or timer is used to decrement the bucket state 602 at a regular interval. When the bucket state 602 is equal to a calibrated value, new events 202 may be ignored. A benefit of this rate control process 1100 is that the behavior is more flexible. A short period of rapid events 202 may still be captured as long as it is not sustained.

With respect to the bucket increment logic, at operation 1102, the event processing application 122 performs detection of events 202. In an example the detection of events 202 may be performed using one or more of the processes 300, 500, 700, or 900 discussed above.

At operation 1104, the event processing application 122 determines whether an event 202 was detected. As some examples, this may be responsive to the events 202 detected at one or more of operations 306, 506, 712, or 918. If so, control passes to operation 1106. Otherwise, control returns to operation 1102.

At operation 1106, the event processing application 122 determines whether the bucket state 602 is full. In an example, the event processing application 122 may compare the value of the bucket state 602 to a predefined maximum bucket limit value. If the bucket state 602 is at least the maximum bucket limit, control proceeds to operation 1108. Otherwise, control proceeds to operation 1110.

At operation 1108, the event processing application 122 ignores the event 202. Accordingly, the maximum bucket limit serves to limit the frequency of event 202 detections. After operation 1108, control returns to operation 1102. At operation 1110, the event processing application 122 increments the bucket state 602. At operation 1112, the event processing application 122 raises the event 202. After operation 1112, control returns to operation 1102.

With respect to the bucket decrement logic, which may be performed concurrent to the bucket increment logic, at operation 1114, the event processing application 122 initializes a bucket decrement counter. If at operation 1116, the bucket decrement counter has elapsed, control passes to operation 1118 to decrement the bucket state 602. If the bucket state 602 is already at the lowest value then the bucket limit value may remain the same. After operation 1118, control returns to operation 1114. If, at operation 1116 the bucket decrement counter has not elapsed, the bucket decrement counter is incremented at operation 1120. After operation 1120, control returns to operation 1114.

In the process 1100, the maximum bucket value and the decrement rate may be calibrated to control the allowance of rapid events 202, as well as the desired average rate of events 202. It should be noted that while the process 1100 is shown as two discrete concurrent flows, in other examples the process 1100 may be performed as a single flow. It should also be noted that one or more operations 1102-1120 of the process 1100 may be executed concurrently, and/or out of order from as shown in the process 1100.

FIG. 12 illustrates an example process 1200 for adaptation of the bucket threshold 604 for use in a leaky bucket implementation. In certain applications, a static definition of an event 202 may be difficult or disadvantageous. An adaptive definition of an event 202 can help reduce the calibration burden (e.g., calibrating the bucket threshold 604 for each model of vehicle 102) and increase the data quality for a wider variety of contexts (e.g., a decreased bucket threshold 604 in less eventful environments to increase sensitivity). The state of the bucket in the rate control method mentioned above may be a useful clue to trigger an adaptation. A simple implementation is to adapt the bucket threshold 604 by a predetermined operation size when the bucket state 602 is either empty or full.

At operation 1202, the event processing application 122 initializes the bucket threshold 604 to a default value. This default value may be set empirically. In an example, the default value may be set to the vehicle 102 as shipped.

At operation 1204, the event processing application 122 determines whether the bucket state 602 is empty. If so, control passes to operation 1206 to reduce the bucket threshold 604 by a predefined amount. If not at operation 1204, and after operation 1206, control proceeds to operation 1208.

At operation 1208, the event processing application 122 determines whether the bucket state 602 is full or at a maximum value. If so, control passes to operation 1210 to grow the bucket threshold 604 by the predefined amount. If not at operation 1208, and after operation 1210, control proceeds to operation 1212.

At operation 1212, the event processing application 122 maintains the bucket threshold 604 at its current value. After operation 1212, control returns to operation 1204. It should be noted that one or more operations 1202-1212 of the process 1200 may be executed concurrently, and/or out of order from as shown in the process 1200.

FIG. 13 illustrates an alternate example process 1300 for adaptation of the bucket threshold 604 for use in a leaky bucket implementation. This alternative embodiment features a more gradual adaptation of the bucket threshold 604. If the decrement rate of the leaky bucket algorithm is calibrated as the average desired rate of events 202, then the difference between the bucket state 602 and half of the maximum value of the bucket state 602 may be used to drive the adaptation. The corrective action may operate to move the average rate of accumulation to the desired rate while maintaining sufficient capability for a short burst of events 202.

As shown, at operation 1302 the event processing application 122 identifies one half of the maximum value for the bucket state 602. This may be a value stored to the vehicle 102 for example. At operation 1304, the event processing application 122 identifies the current bucket state 602. This value may be the bucket state 602 from a leaky bucket implementation, such as that shown in the processes 700 or 1100.

At operation 1306, the event processing application 122 compute a difference between the one half of the maximum value and the bucket state 602. It should be noted that this value may be positive or negative.

At operation 1308, the event processing application 122 identifies an adaptation rate for the vehicle 102. The adaptation rate may serve to determine whether an update to the bucket threshold 604 should be applied.

The adaptation rate may be a useful parameter to configure. A very slow adaptation rate (e.g., where meaningful change occurs over weeks/months) can help account for differences between vehicle 102 models, seasonal environment changes, and aging characteristics of the vehicle 102. A faster adaptation rate (e.g., where meaningful change occurs over minutes/hours) can account for differences in driving conditions and ambient environments.

The adaptation rate may define a multiplier that is applied to the difference computed at operation 1306. In such a case the difference may be scaled to slow or speed the adaptation. At operation 1310, the event processing application 122 multiples the difference by the adaptation rate multiplier.

At operation 1312, the event processing application 122 identifies the current bucket threshold 604. At operation 1314, the value determined at operation 1010 may be added to the current bucket threshold 604 to create a new bucket threshold 604. As the value determined at operation 1010 may be positive or negative, the adaptation may raise or lower the bucket threshold 604. At operation 1316, this new bucket threshold 604 may be applied as the bucket threshold 604 moving forward. In this way, the bucket threshold 604 may be adapted.

Thus, responsive to the bucket state 602 being above one half of the maximum bucket value, the bucket threshold 604 is increased an amount proportional to the difference between the bucket state 602 and one half of its maximum value to reduce the sensitivity of the event 202 detection (and therefore detect fewer events 202). Also, responsive to the bucket state 602 being below one half of the maximum bucket value, the bucket threshold 604 is decreased an amount proportional to the difference between the bucket state 602 and one half of its maximum value. This may increase the event 202 detection sensitivity.

It should be noted that while the process 1300 is shown as a single iteration, in many examples the process 1300 may be performed continuously, such as in a loopwise manner. It should also be noted that one or more operations 1302-1316 of the process 1300 may be executed concurrently, and/or out of order from as shown in the process 1300.

FIG. 14 illustrates an example process 1400 for performing GNSS upscaling with respect to the augmentation of the events 202 with location information. The association of an event 202 with a specific location and time is useful to many applications wherein the vehicle 102 is used as a sensor 106 for its environment. GNSS data may be made available via the GNSS controller 104F; however this information may be subject to a much slower update rate than many of the other sensors 106. If the GNSS update rate is once-per-second, this would translate to over a 100 ft distance between updates at highway speeds. If more precision is required for the application, a method for up-sampling the GNSS state may be appropriate. To ensure maximum data efficiency, the upscaling may be handled in the vehicle 102 to reduce the amount of data transmission that is performed.

With respect to the GNSS update logic, at operation 1402 the event processing application 122 receives an updated GNSS location. In an example, the event processing application 122 may receive an updated location and time of update of the vehicle 102 via the vehicle bus 108 from the GNSS controller 104F. The event processing application 122 may maintain this updated value into a location buffer 1404, as shown. The location buffer 1404 may store a history of at least the two most recent locations and times at which those locations are captured by the GNSS controller 104F, information which is readily available via GNSS.

With respect to the triggering of an event 202 such as shown in one or more of operations 306, 506, 712, or 918, at operation 1406 the event processing application 122 unpacks a timestamp of the event 202. For example, the event 202 when triggered may include a current timestamp of the occurrence of the event 202, which may be accessed by the event processing application 122.

At operation 1408, the event processing application 122 extrapolates the GNSS location maintained to the location buffer 1404 to account for the time of the event 202. In an example, the event processing application 122 may perform dead reckoning to extrapolate the most recent location in the location buffer 1404 to the time of the event 202 based on the most recent two values in the location buffer 1404.

At operation 1410, the event processing application 122 packs the location, as extrapolated, into the event 202. Thus, the event 202 may include an extrapolated location that is likely to be more accurate than simply using the last location update that was received from the GNSS controller 104F. At operation 1412, the event processing application 122 provides the event 202, as augmented.

It should be noted that while the process 1400 is shown as two discrete concurrent flows, in many examples the process 1400 may be performed continuously, such as in a loopwise manner. It should also be noted that one or more operations 1402-1412 of the process 1400 may be executed concurrently, and/or out of order from as shown in the process 1400.

FIG. 15 illustrates an alternate example process 1500 for performing GNSS upscaling with respect to the augmentation of the events 202 with location information. Notably, while the process 1400 is simple and low overhead, forward extrapolation may be imprecise during speed and steering changes. The process 1500 accordingly illustrates a more precise approach to using interpolation instead of extrapolation. This may add complexity to the algorithm, as the detected event 202 information is temporarily stored until the next GNSS event 202 is available. In this algorithm, detected events 202 are added into a queue. Responsive to a new GNSS update is available, then interpolation is used (with this new update and the previous update) to estimate the position of the event 202 based on the timestamp of the event 202 and the two recent GNSS update timestamps. The results of the GNSS interpolation may be stored with the other event 202 information and the event 202 queue may be purged.

With respect to the event 202 trigger logic, at operation 1502, the event processing application 122 adds an event 202 to an event queue 1504. For example, the event 202 may be triggered such as shown in one or more of operations 306, 506, 712, or 918. The event 202 may be stored to the event queue 1504 for further processing. As noted above, the event 202 may include a current timestamp of the occurrence of the event 202.

With respect to the GNSS update logic, at operation 1506 (similar to operation 1402) the event processing application 122 receives an updated GNSS location. The event processing application 122 may maintain this updated value into a location buffer 1508, as shown. The location buffer 1508 may store a history of at least the two most recent locations and times at which those locations are captured by the GNSS controller 104F.

At operation 1510, the event processing application 122 determines whether there are any events 202 in the event queue 1504. If so, control proceeds to operation 1512. If not, control returns to operation 1506 to await the next GNSS update.

At operation 1512, the event processing application 122 performs GNSS interpolation. In an example, the event processing application 122 may interpolate the two most recent locations in the location buffer 1404 before and after the time of the event 202 for the time at which the event 202 occurred. This may assume constant speed of the vehicle 102 in an example, but other approaches accounting for the recent speed and/or changes in speed of the vehicle 102 (e.g., as determine from vehicle bus 108 data) may be performed.

At operation 1514, the event processing application 122 packs the GNSS location into the events 202. Thus, the event 202 may include an interpolated location that is likely to be more accurate than simply using the last location update that was received from the GNSS controller 104F. At operation 1516, the event processing application 122 clears the event queue 1504. At operation 1518, the event processing application 122 provides the events 202, as augmented. After operation 1518, control returns to operation 1506.

Thus, as the GNSS position has been up-sampled to estimate the exact GNSS position corresponding with the event 202, the GNSS data is packaged up with the other data of the event 202 (e.g., time, magnitude, direction, etc.). This complete event 202 package may either be transmitted immediately or stored with other accumulated events 202 and transmitted at some regular interval or at another event 202 such as shifting to park or turning off the vehicle 102.

As an alternative to either extrapolation or interpolation, the location buffers 1404 or 1508 may be transmitted with each event 202 and the up-sampling can be performed in post-processing. The results will be identical; however, the data consumption may increase as compared to the approach shown in the process 1500.

Thus, the location-specific logging of events 202 in a vehicle 102 may provide significant value, including applications in which the vehicle 102 is used as a sensor 106 for its environment. The aforementioned algorithms and processes may enhance the accuracy and data efficiency in-vehicle data collection.

Figure 16:
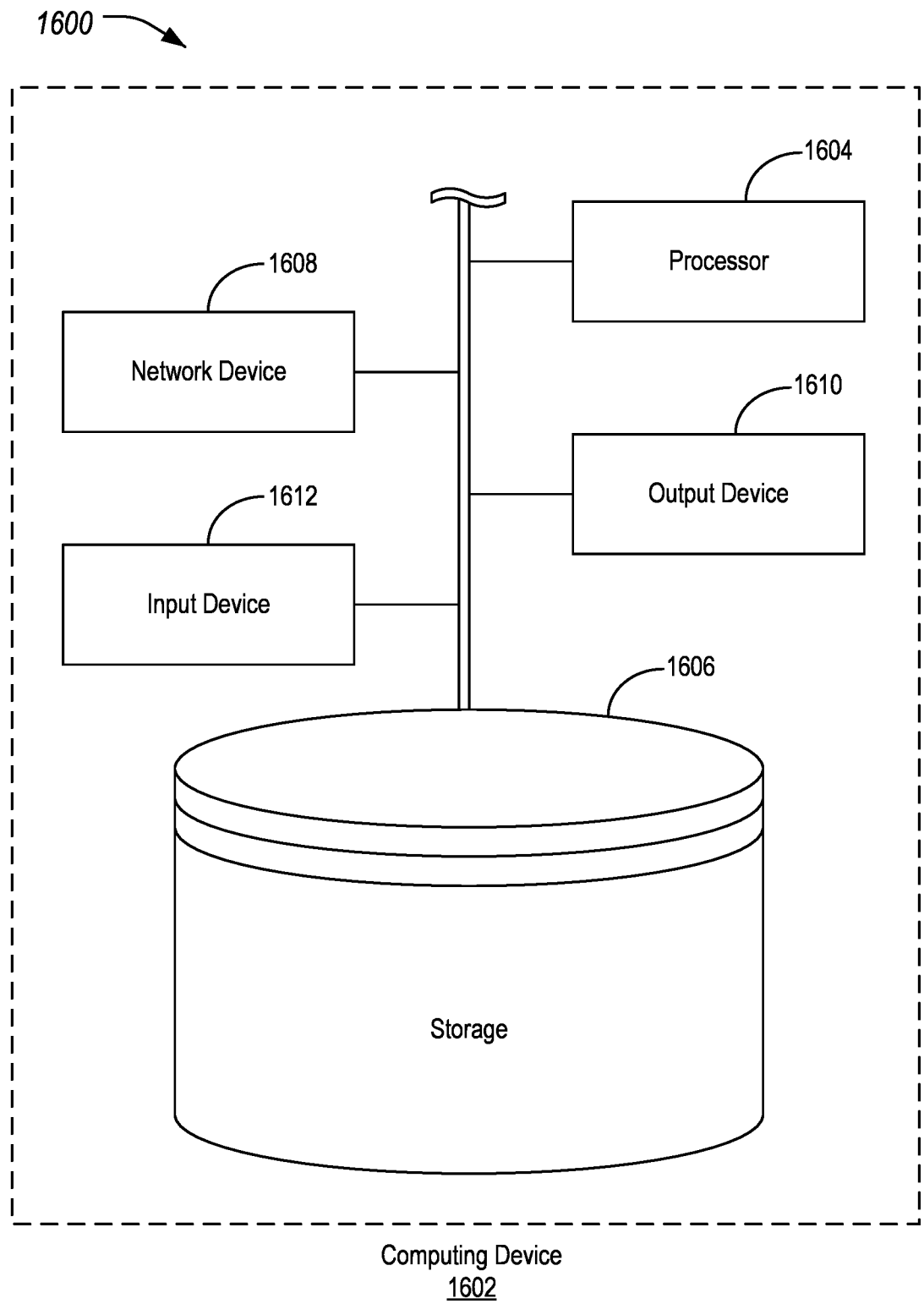
FIG. 16 illustrates an example of a computing device for performing aspects of on-vehicle sensor event and location data fusion with rate control and adaptive event thresholding.

FIG. 16 illustrates an example 1600 of a computing device 1602 for performing aspects of on-vehicle sensor 106 data and location data fusion with rate control and adaptive event 202 thresholding. Referring to FIG. 16, and with reference to FIGS. 1-15, the controllers 104, sensors 106, TCU 110, processor 116, cloud servers 124, data store 128, and/or client devices 132 may be examples of such computing devices 1602. As shown, the computing device 1602 includes a processor 1604 that is operatively connected to a storage 1606, a network device 1608, an output device 1610, and an input device 1612. It should be noted that this is merely an example, and computing devices 1602 with more, fewer, or different components may be used.

The processor 1604 may include one or more integrated circuits that implement the functionality of a central processing unit (CPU) and/or graphics processing unit (GPU). In some examples, the processors 1604 are a system on a chip (SoC) that integrates the functionality of the CPU and GPU. The SoC may optionally include other components such as, for example, the storage 1606 and the network device 1608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1604 executes stored program instructions that are retrieved from the storage 1606. The stored program instructions, accordingly, include software that controls the operation of the processors 1604 to perform the operations described herein. The storage 1606 may include both non-volatile memory and volatile memory devices. The non-volatile memory includes solid-state memories, such as negative-AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1610. The output device 1610 may include a graphical or visual display device, such as an electronic display screen, projector, printer, or any other suitable device that reproduces a graphical display. As another example, the output device 1610 may include an audio device, such as a loudspeaker or headphone. As yet a further example, the output device 1610 may include a tactile device, such as a mechanically raiseable device that may, in an example, be configured to display braille or another physical output that may be touched to provide information to a user.

The input device 1612 may include any of various devices that enable the computing device 1602 to receive control input from users. Examples of suitable input devices that receive human interface inputs may include keyboards, mice, trackballs, touchscreens, voice input devices, graphics tablets, and the like.

The network devices 1608 may each include any of various devices that enable the vehicles 102 and cloud server 124 to send and/or receive data from external devices over networks. Examples of suitable network devices 1608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing sensor events, comprising:
a first controller of a vehicle configured to maintain a bucket state over time in a storage, the bucket state accumulating evidence of events and decaying over time, wherein the first controller is programmed to iteratively:
   receive a signal from a sensor or other controller of the vehicle,
   responsive to the signal exceeding a signal threshold, increment the bucket state by a quantity determined as a difference between the signal and the signal threshold,
   responsive to the signal not exceeding the signal threshold, decrement the bucket state by a fixed, predetermined amount,
   generate an event responsive to the bucket state exceeding a bucket threshold value, and
   send the event, in an event message, to a cloud server.

2. The system of claim 1, wherein the first controller is further programmed to periodically decrement the bucket state.

3. The system of claim 1, wherein the first controller is further programmed to:
   responsive to detection of the event, activate a searching period for capture of a peak value of the signal; and
   include the peak value in the event.

4. The system of claim 1, wherein the first controller is further programmed to:
   responsive to detection of the event, suspend detection of further events for a predefined suspension period; and
   responsive to expiration of the predefined suspension period, resume the detection of further events.

5. The system of claim 1, wherein the first controller is further programmed to:
   responsive to the bucket state reaching a maximum value, refrain from generating further events until the bucket state lowers to a level below the maximum value.

6. The system of claim 1, where the first controller is further programmed to:
   responsive to the bucket state reaching a minimum value, shrink the bucket threshold value by a predefined amount;
   responsive to the bucket state reaching a maximum value, grow the bucket threshold value by the predefined amount; and
   responsive to the bucket state being between the minimum and maximum values, neither shrink nor grow the bucket threshold value.

7. The system of claim 1, wherein the first controller is further programmed to:
   responsive to the bucket state being above one half of a maximum bucket value, increase the bucket threshold value by an amount proportional to a difference between the bucket state and one half of the maximum bucket value, thereby reducing a sensitivity of detection of future events; and
   responsive to the bucket state being below one half of the maximum bucket value, decrease the bucket threshold value by the amount proportional to the difference between the bucket state and one half of its maximum value, thereby increasing the sensitivity of the detection of future events.

8. The system of claim 1, wherein the first controller is further programmed to:
   maintain, in a location buffer, a plurality of most recently received GNSS locations;
   extrapolate a location of the event based on the most recently received GNSS locations and a time of the event; and
   pack the location into the event.

9. The system of claim 1, wherein the first controller is further programmed to:
   maintain, in a location buffer, a first GNSS location of the vehicle determined before occurrence of the event;
   maintain the event in an event queue;
   responsive to receipt of a second GNSS location after the occurrence of the event, interpolate an event location of the event based on the first and second GNSS locations and a time of the event;
   remove the event from the event queue; and
   pack the event location into the event.

10. An iterative method for providing sensor events, comprising:
   receiving, by a first controller of a vehicle, a signal from a sensor or other controller of the vehicle, the first controller configured to maintain a bucket state over time in a storage, the bucket state accumulating evidence of events and decaying over time;

incrementing the bucket state by a quantity determined as a difference between the signal and the signal threshold, by the first controller, responsive to the signal exceeding a signal threshold;

responsive to the signal not exceeding the signal threshold, decrement the bucket state by a fixed, predetermined amount;

generating an event, by the first controller, responsive to the bucket state exceeding a bucket threshold value; and sending the event, in an event message, by the first controller to a cloud server.

11. The method of claim 10, further comprising: periodically decrementing the bucket state.

12. The method of claim 10, further comprising: responsive to detection of the event, activating a searching period for capture of a peak value of the signal; and including the peak value in the event.

13. The method of claim 10, further comprising: responsive to detection of the event, suspending detection of further events for a predefined suspension period; and responsive to expiration of the predefined suspension period, resuming the detection of further events.

14. The method of claim 10, further comprising: responsive to the bucket state reaching a maximum value, refraining from generating further events until the bucket state lowers to a level below the maximum value.

15. The method of claim 10, further comprising: responsive to the bucket state reaching a minimum value, shrinking the bucket threshold value by a predefined amount;

responsive to the bucket state reaching a maximum value, growing the bucket threshold value by the predefined amount; and responsive to the bucket state being between the minimum and maximum values, neither shrinking nor growing the bucket threshold value.

16. The method of claim 10, further comprising: responsive to the bucket state being above one half of a maximum bucket value, increasing the bucket threshold value by an amount proportional to a difference between the bucket state and one half of the maximum bucket value, thereby reducing a sensitivity of detection of future events; and responsive to the bucket state being below one half of the maximum bucket value, decreasing the bucket threshold value by the amount proportional to the difference between the bucket state and one half of its maximum value, thereby increasing the sensitivity of the detection of future events.

17. The method of claim 10, further comprising: maintaining, in a location buffer, a plurality of most recently received GNSS locations;

extrapolating a location of the event based on the most recently received GNSS locations and a time of the event; and packing the location into the event.

18. The method of claim 10, further comprising: maintaining, in a location buffer, a first GNSS location of the vehicle determined before occurrence of the event;

maintaining the event in an event queue;

responsive to receipt of a second GNSS location after the occurrence of the event, interpolating an event location of the event based on the first and second GNSS locations and a time of the event;

removing the event from the event queue; and packing the event location into the event.

19. A non-transitory computer-readable medium comprising instructions for providing sensor events that, when executed by a first controller of a vehicle, cause the vehicle to perform operations including to:

maintain a bucket state over time in a storage, the bucket state accumulating evidence of events and decaying over time;

receive a signal from a sensor or other controller of the vehicle;

increment the bucket state by a quantity determined as a difference between the signal and the signal threshold responsive to the signal exceeding a signal threshold;

decrement the bucket state by a fixed, predetermined amount responsive to the signal not exceeding the signal threshold;

generate an event responsive to the bucket state exceeding a bucket threshold value; and send the event, in an event message, to a cloud server.

\* \* \* \* \*